(12) United States Patent
Luo et al.

(10) Patent No.: US 11,204,315 B2
(45) Date of Patent: Dec. 21, 2021

(54) METHOD FOR CONTROLLING OPTICAL SUBSTANCE DETECTION DEVICE, OPTICAL SUBSTANCE DETECTION DEVICE AND COMPUTER-READABLE STORAGE MEDIUM

(71) Applicant: CLOUDMINDS (SHENZHEN) HOLDINGS CO., LTD., Shenzhen (CN)

(72) Inventors: Lei Luo, Shenzhen (CN); Taotao Mu, Shenzhen (CN)

(73) Assignee: CLOUDMINDS (SHENZHEN) HOLDINGS CO., LTD., Shenzhen (CN)

(*) Notice: Subject to any disclaimer, the term of this patent is extended or adjusted under 35 U.S.C. 154(b) by 0 days.

(21) Appl. No.: 16/728,164

(22) Filed: Dec. 27, 2019

(65) Prior Publication Data
US 2020/0240905 A1 Jul. 30, 2020

(30) Foreign Application Priority Data
Dec. 28, 2018 (CN) .......................... 201811624710.6

(51) Int. Cl.
*G01N 21/27* (2006.01)
*G01N 21/31* (2006.01)
(Continued)

(52) U.S. Cl.
CPC ............ *G01N 21/274* (2013.01); *G01J 3/027* (2013.01); *G01J 3/28* (2013.01); *G01N 21/31* (2013.01); *G01N 2201/121* (2013.01)

(58) Field of Classification Search
CPC ................. G01N 21/274; G01N 21/31; G01N 2201/121; G01J 3/027; G01J 3/28;
(Continued)

(56) References Cited

U.S. PATENT DOCUMENTS 7,596,466 B2 * 9/2009 Ohta ........................ A63F 13/10
702/152
2015/0040665 A1 * 2/2015 Borkholder ............. G01P 15/14
73/510

(Continued)

FOREIGN PATENT DOCUMENTS

CN 104937396 A 9/2015
CN 207816460 U 9/2018
(Continued)

OTHER PUBLICATIONS

The First Chinese Office Action dated Dec. 21, 2020; Appln. No. 201811624710.6.
(Continued)

*Primary Examiner* — Michael P LaPage

(57) ABSTRACT

A method for controlling an optical substance detection device, wherein the optical substance detection device includes a light sensing device, includes: when it is detected that the optical substance detection device is subjected to an impact, acquiring an impact force and an impact direction when the optical substance detection device is subjected to the impact; calculating a light sensing displacement deviation value according to a predetermined data model and in combination with the impact force and the impact direction; and performing light sensing correction according to the light sensing displacement deviation value.

20 Claims, 2 Drawing Sheets

(51) Int. Cl.
  *G01J 3/02* (2006.01)
  *G01J 3/28* (2006.01)
(58) Field of Classification Search
  CPC ........... H04N 5/23254; H04N 5/23258; G02B 27/644; G02B 27/646
  See application file for complete search history.

(56) References Cited

U.S. PATENT DOCUMENTS

2017/0168769 A1* 6/2017 Jeon ..................... G06F 1/1652
2020/0326237 A1* 10/2020 Yamamoto ............ G01J 3/0275

FOREIGN PATENT DOCUMENTS

| JP | 2010153545 A | 7/2010 | |
| WO | 2017179520 A1 | 10/2017 | |
| WO | WO-2017179520 A1 * | 10/2017 | ............ G01J 3/0275 |

OTHER PUBLICATIONS

The Japanese Office Action dated Jan. 21, 2021; Appln. No. 228-910.

* cited by examiner

METHOD FOR CONTROLLING OPTICAL SUBSTANCE DETECTION DEVICE, OPTICAL SUBSTANCE DETECTION DEVICE AND COMPUTER-READABLE STORAGE MEDIUM

CROSS-REFERENCE TO RELATED APPLICATIONS

This application claims priority to Chinese Patent Application No. 201811624710.6, filed with the Chinese Patent Office on Dec. 28, 2018, titled "METHOD AND APPARATUS FOR CONTROLLING OPTICAL SUBSTANCE DETECTION DEVICE, AND OPTICAL SUBSTANCE DETECTION DEVICE", the entire contents of which are incorporated herein by reference.

TECHNICAL FIELD

Embodiments of the present application relate to the technical field of optical substance detection, and in particular, relate to a method and apparatus for controlling an optical substance detection device, and an optical substance detection device.

BACKGROUND

A conventional optical substance detection device emits light, scatters the light over a substance or the surface of the substance, collects spectrums of the light, and then identifies the substance based on the collected spectrums.

During practice of the present application, the inventors have found that the optical substance detection device is generally precise, and may cause deviation of an optical path in case of impacts. However, microns of deviations may cause incomplete collected spectrums, and thus the spectrums fail to be identified.

SUMMARY

An embodiment of the present application provides a method for controlling an optical substance detection device, the optical substance detection device comprising a light sensing device. The method includes: when it is detected that the optical substance detection device is subjected to an impact, acquiring an impact force and an impact direction when the optical substance detection device is subjected to the impact; calculating a light sensing displacement deviation value according to a predetermined data model and in combination with the impact force and the impact direction; and performing light sensing correction according to the light sensing displacement deviation value.

Another embodiment of the present application provides an optical substance detection device. The optical substance detection device includes: a light emitting device, a light sensing device, a processor, a memory, a communication interface and a communication bus; wherein the light emitting device, the light sensing device, the processor, the memory and the communication bus communicate with each other via the communication bus; and the memory is configured to store at least one executable instruction, wherein the executable instruction, when being executed, causes the processor to perform the steps of: when it is detected that the optical substance detection device is subjected to an impact, acquiring an impact force and an impact direction when the optical substance detection device is subjected to the impact; calculating a light sensing displacement deviation value according to a predetermined data model and in combination with the impact force and the impact direction; and performing light sensing correction according to the light sensing displacement deviation value.

Still another embodiment of the present application provides a computer-readable storage medium. The storage medium stores at least one executable instruction; wherein the executable instruction, when being executed, causes a processor to perform the steps of: when it is detected that the optical substance detection device is subjected to an impact, acquiring an impact force and an impact direction when the optical substance detection device is subjected to the impact; calculating a light sensing displacement deviation value according to a predetermined data model and in combination with the impact force and the impact direction; and performing light sensing correction according to the light sensing displacement deviation value.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present application. In all the accompanying drawings, like reference signs denote like parts. In the drawings.

DETAILED DESCRIPTION

Some exemplary embodiments of the present application are hereinafter described in detail with reference to the accompanying drawings. Although the accompanying drawings illustrate the exemplary embodiments of the present application, it shall be understood that the present application may be practiced in various manners, and the present application shall not be limited by the embodiments illustrated herein. On the contrary, these embodiments are described herein only for the purpose of better understanding the present application, and may integrally convey the scope of the present application to a person skilled in the art.

Figure 1:
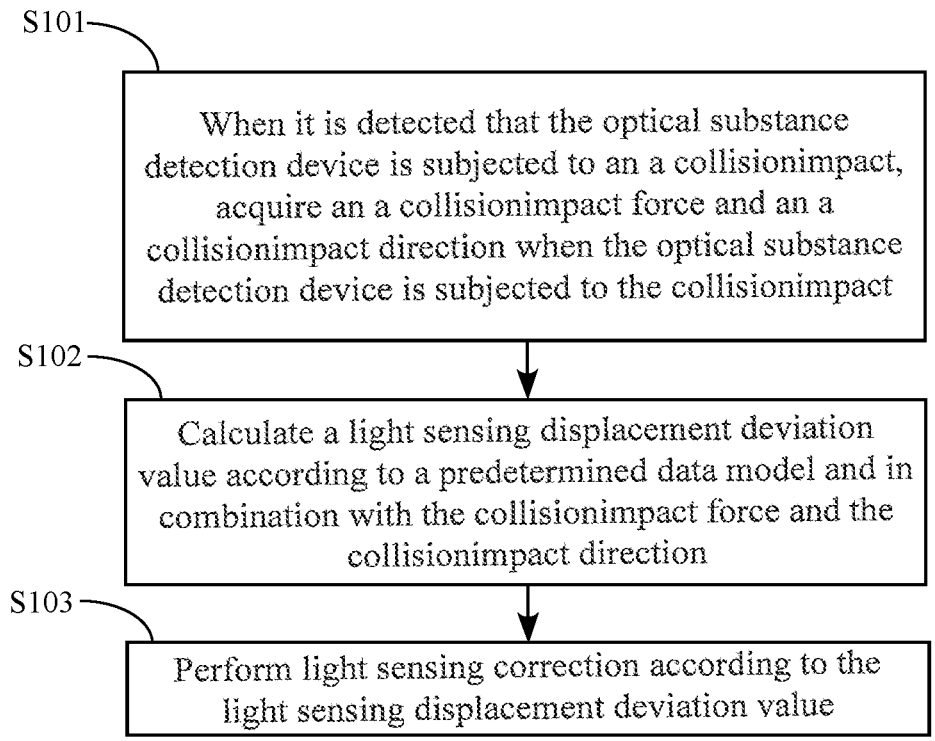
FIG. 1 is a flowchart of a method for controlling an optical substance detection device according to an embodiment of the present application.

FIG. 1 is a flowchart of a method for controlling an optical substance detection device according to an embodiment of the present application. As illustrated in FIG. 1, the method includes the following steps:

Step S101: When it is detected that the optical substance detection device is subjected to an impact, an impact force and an impact direction when the optical substance detection device is subjected to the impact are acquired.

The optical substance detection device irradiates detection light to a substance under detection. After the substance under detection is under irradiation of the detection light, molecules of the substance may cause the detection light to be scattered or reflected. The optical substance detection device captures a spectrum of the scattered or reflected light, and determines a category of the substance under detection according to a frequency difference between the scattered light and the detection light.

The detection light is output by a light emitting device in the optical substance detection device, and the spectrum of the scattered light or the reflected light is captured by a light sensing device in the optical substance detection device. When the optical substance detection device is subjected to an impact, for example, the device drops down to the ground from a higher position, or an external object directly impacts the optical substance detection device, the position of the light sensing device or/and the light emitting device may be shifted, such that an optical path of the reflected light or the scattered light may not fall on a light sensing surface of the light sensing device. As such, the optical substance detection device fails to accurately identify the substance. Therefore, when the optical substance detection device is subjected to an impact, it is necessary to perform a control operation for the optical substance detection device.

In some embodiments, for identification whether the optical substance detection device is subjected to an impact, a sensor may be pre-arranged in the optical substance detection device, for example, an acceleration sensor, a gravity sensor, a gyroscope, or a geomagnetic sensor or the like. Whether the optical substance detection device is subjected to an impact is detected by using the sensor. When the optical substance detection device is subjected to an impact, impact forces in three directions of X, Y and Z in a three-dimensional space are determined according to the data acquired by the sensor.

Step S102: A light sensing displacement deviation value is calculated according to a predetermined data model and in combination with the impact force and the impact direction.

The light sensing displacement deviation value refers to a measured deviation between a detected spectrum position and a correct spectrum position upon calibration of the optical substance detection device after delivery from factory, under the same test conditions in detection of the same substance. The returned light includes a reflected light or a scattered light excited when the substance under detection is irradiated by the detection light. The light sensing displacement deviation may be caused due to displacements of some parts or elements in the optical substance detection device, for example, movement or loosing of some lens in the optical path of the device.

The predetermined data model refers to a pre-established corresponding relationship between an impact force and impact direction, and the light sensing displacement deviation value. The corresponding relationship may be obtained by means of a plurality of previous impact experiments, wherein the impact experiments include impacting the calibrated optical substance detection device in various ways and using various forces, comparing a displacement deviation of the detection spectrum before and after the impact, and recording the light sensing displacement deviation value where the optical substance detection device is subjected to a determined impact direction and impact force.

Step S103: Light sensing correction is performed according to the light sensing displacement deviation value.

When the optical substance detection device is subjected to an impact, performing the light sensing correction for the optical substance detection device is favorable to preventing the case where the optical substance detection device fails to correctly identify the substance due to the light sensing deviation.

In some embodiments, the performing light sensing correction according to the light sensing displacement deviation value in step S103 includes the following sub-steps:

(1) The optical substance detection device is controlled to continue operating normally when the light sensing displacement deviation value is less than a predetermined minimum value.

When a minor position deviation is present in the light sensing device and the light emitting device, a deviation is caused between the returned light and a predetermined light sensing region on the light sensing surface of the light sensing device. However, when this deviation does not affect accuracy of detection by the optical substance detection device, this position deviation may be ignored, and the optical substance detection device continues operating. The predetermined minimum value is a maximum value of the accuracy of detection by the optical substance detection device that is not affected by the deviation between the returned light and the predetermined light sensing region on the light sensing surface of the light sensing device.

(2) Calibration alarm information indicating that the optical substance detection device needs to be calibrated is sent when the light sensing displacement deviation value is greater than or equal to a predetermined minimum value and is less than or equal to a predetermined maximum value.

The area of the light sensing region of the light sensing device is generally greater than the area of a cross section of the returned light. When the light sensing device and/or the light emitting device is subjected to a displacement, as long as the returned light does not fall outside the light sensing surface of the light sensing device, the light sensing device is still capable of sensing all the returned light, and is still capable of performing substance detection. To be brief, a specific deviation tolerance is allowed between the positions of the light sensing device and the light emitting device. A predetermined maximum value of the deviation tolerance is determined by the size of the light sensing surface.

It should be noted that the predetermined minimum value may be defined according to plural experiments and tests, and the predetermined maximum value is determined according to a maximum range of the light sensing surface of the light sensing device in the optical substance detection device.

The calibration alarm information may be output in the form of audio or display.

(3) The optical substance detection device is controlled to stop operating and sending a repair alarm information indicating that the optical substance detection device needs to be repaired when the light sensing displacement deviation value is greater than a predetermined maximum value.

When the light sensing displacement deviation value is greater than the predetermined maximum value, it indicates that the returned light falls outside the light sensing surface of the light sensing device. If the light sensing displacement deviation value is greater, substance detection may not be performed, and correction may not be practiced only by means of calibration. Therefore, it is necessary to repair the optical substance detection device.

The repair alarm information may also be output in the form of audio and display. In some embodiments, the repair alarm information and the calibration alarm information may be represented in different forms. For example, a yellow indicator indicates the calibration alarm information, and a red indicator indicates the repair alarm information. In this way, the current conditions of the optical substance detection device may be quickly identified according to the alarm information output by the optical substance detection device, and corresponding operations may be quickly performed.

In some embodiments, the performing light sensing correction further includes:

when the light sensing displacement deviation value is greater than or equal to the predetermined minimum value, and is less than or equal to the predetermined maximum value, judging whether the light sensing displacement deviation value is previously stored; and if the light sensing displacement deviation value is not previously stored, storing the light sensing displacement deviation value, and correct the spectrum position of the returned light sensed by the light sensing device according to the light sensing displacement deviation value when the light sensing device senses the returned light.

After the light sensing displacement deviation value is stored, and when the optical substance detection is subsequently performed, the spectrum position of the sensed returned light is corrected according to the light sensing displacement deviation value, such that the optical substance detection device may still perform the substance detection in case of an impact. In this way, the accuracy of the substance detection is not affected, and the optical substance detection device does not need to be stopped and repaired.

Further, the performing light sensing correction further includes: outputting calibration alarm information indicating that the optical substance detection device needs to be calibrated and controlling the optical substance detection device to stop operating if the light sensing displacement deviation value is previously stored; and clearing the stored light sensing displacement deviation value when it is detected that a light sensing optical path of the light sensing device is successfully calibrated.

When the light sensing displacement deviation value is stored, it indicates that the optical substance detection device is previously subjected to an impact, and the correction is not performed yet. In a mechanical structure, it is inappropriate to simply superimpose results of two impacts for the reason that: when the optical substance detection device is previously subjected to an impact, the mechanical structure of the optical substance detection device may be modified, and a later impact is exerted on the optical substance detection device with the modified mechanical structure, wherein the modifications are not anticipatable. Therefore, it is more suitable to directly repair the device.

It should be noted that, in this embodiment, whether the optical substance detection device is in a calibrated state is indicated by judging whether a light sensing displacement deviation value is present. That is, if the light sensing displacement deviation value is not stored, it indicates that the optical substance detection device is calibrated; and if the light sensing displacement deviation value is stored, it indicates that the optical substance detection device is not calibrated. In some other embodiments, the calibrated state of the optical substance detection device may be indicated in other ways, which are not described herein any further. Nevertheless, in some embodiments, prior to performing the detection each time, the optical substance detection device may perform the calibration operation, such that the accuracy of the detection by the optical substance detection device is ensured.

In the embodiment of the present application, when the optical substance detection device is subjected to an impact, a light sensing displacement deviation value of the light sensing device is calculated, and light sensing correction is performed according to the light sensing displacement deviation value. In this way, it is favorable to prevention of incomplete spectrums sensed by the light sensing device due to the light sensing deviation when the optical substance detection device subsequently detects a substance, such that the accuracy of the substance detection by the optical substance detection device is not affected.

Figure 2:
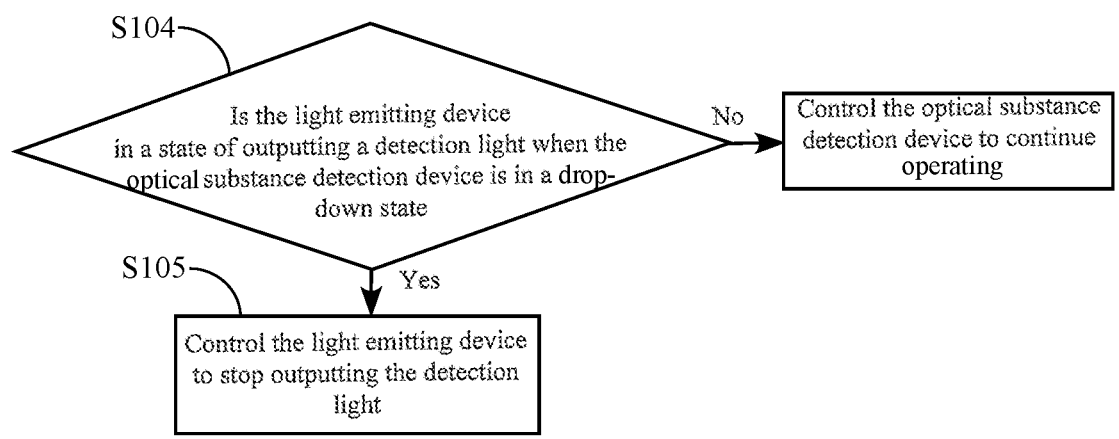
FIG. 2 is a flowchart of a method for controlling an optical substance detection device according to another embodiment of the present application.

Referring to FIG. 2, FIG. 2 is a flowchart of a method for controlling an optical substance detection device according to another embodiment of the present application. Different from the above embodiment, in this embodiment, the method further includes the following steps:

Step S104: Whether the light emitting device is in a state of outputting a detection light is judged when it is detected that the optical substance detection device is in a drop-down state; and step S105 is performed if the light emitting device is in the state of outputting the detection light, and otherwise, the optical substance detection device is controlled to continue operating.

If the light emitting device is in the state of outputting the detection light, it indicates that the optical substance detection device is in a substance detection state. When the optical substance detection device is in the substance detection state, the detection light output by the light emitting device has a extremely high intensity. If the detection light is irradiated to other substances, these substances may be burnt. When the optical substance detection device is in a drop-down state, the light output by the light emitting device is uncontrollable in terms of direction. Therefore, when the optical substance detection device is in the drop-down state, it is necessary to stop outputting the detection light to prevent the other substance from being burnt.

It may be understood that whether the optical substance detection device is in the drop-down state may also be detected by using a sensor arranged on the optical substance detection device. For example, an acceleration value of the optical substance detection device is detected based on acceleration, and whether the optical substance detection device is in the drop-down state is determined according to the acceleration value.

Step S105: The light emitting device is controlled to stop outputting the detection light if the light emitting device is in the state of outputting the detection light.

Nevertheless, in some embodiments, in addition to controlling the light emitting device to stop outputting the detection light, other parts of the optical substance detection device may also be controlled to stop operating.

In the embodiment of the present application, when the optical substance detection device is in the drop-down state, and the light emitting device of the optical substance detection device outputs the detection light, the light emitting device is controlled to stop outputting the detection light, to prevent the case where other substances are burnt by the detection light when the detection light is irradiated towards other directions in the process of dropping down of the optical substance detection device.

An embodiment of the present application provides a non-volatile computer-readable storage medium, wherein the computer-readable storage medium stores at least one computer-executable instruction, which may be executed to perform the method for controlling an optical substance detection device in any of the above method embodiments.

Figure 3:
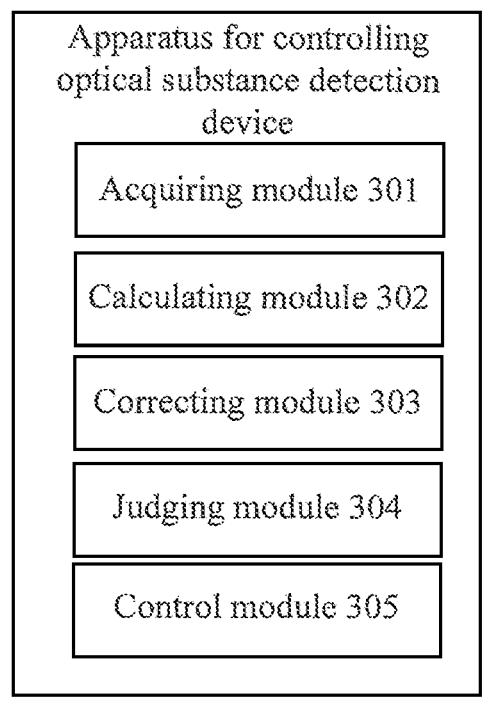
FIG. 3 is a functional block diagram of an apparatus for controlling an optical substance detection device according to an embodiment of the present application.

FIG. 3 is a functional block diagram of an apparatus for controlling an optical substance detection device according to an embodiment of the present application. The apparatus includes an acquiring module 301, a calculating module 302, a correcting module 303, a judging module 304 and a control module 305.

The acquiring module 301 is configured to, when it is detected that the optical substance detection device is subjected to an impact, acquire an impact force and an impact direction when the optical substance detection device is subjected to the impact.

The calculating module 302 is configured to calculate a displacement deviation value according to a predetermined data model and in combination with the impact force and the impact direction.

The correcting module 303 is configured to perform light sensing correction according to the light sensing displacement deviation value.

In some embodiments, the correcting module 303 is further configured to: control the optical substance detection device to continue operating normally when the light sensing displacement deviation value is less than a predetermined minimum value; send calibration alarm information indicating that the optical substance detection device needs to be calibrated when the light sensing displacement deviation value is greater than or equal to a predetermined minimum value and is less than or equal to a predetermined maximum value; or control the optical substance detection device to stop operating and send a repair alarm information indicating that the optical substance detection device needs to be repaired when the light sensing displacement deviation value is greater than a predetermined maximum value.

In some embodiments, the correcting module 303 is further configured to: judge whether the light sensing displacement deviation value is previously stored when the light sensing displacement deviation value is greater than or equal to a predetermined minimum value; and store the light sensing displacement deviation value if the light sensing displacement deviation value is not previously stored, and correct a spectrum position of a returned light sensed by the light sensing device according to the light sensing displacement deviation value when the light sensing device senses the returned light.

In some embodiments, the correcting module 303 is further configured to: output calibration alarm information indicating that the optical substance detection device needs to be calibrated and control the optical substance detection device to stop operating if the light sensing displacement deviation value is previously stored; and clear the stored light sensing displacement deviation value when it is detected that a light sensing optical path of the light sensing device is successfully calibrated.

The judging module 304 is configured to judge whether the light emitting device is in a state of outputting a detection light when it is detected that the optical substance detection device is in a drop-down state.

The control module 305 is configured to control the light emitting device to stop outputting the detection light if the light emitting device is in the state of outputting the detection light.

In the embodiment of the present application, impact force information when the optical substance detection device is subjected to an impact is acquired by the acquiring module 301, a light sensing displacement deviation value of the light sensing device is calculated by the calculating module 302, and light sensing correction is performed by the correcting module 303 according to the light sensing displacement deviation value. In this way, it is favorable to prevention of incomplete spectrums sensed by the light sensing device due to the light sensing deviation when the optical substance detection device subsequently detects a substance, such that the accuracy of the substance detection by the optical substance detection device is not affected. In addition, whether the light emitting device of the optical substance detection device outputs the detection light is judged by the judging module 304 when the optical substance detection device is in the drop-down state; and if the light emitting device outputs the detection light, the light emitting device is controlled to stop outputting the detection light, to prevent the case where other substances are burnt by the detection light when the detection light is irradiated towards other directions in the process of dropping down of the optical substance detection device.

Figure 4:
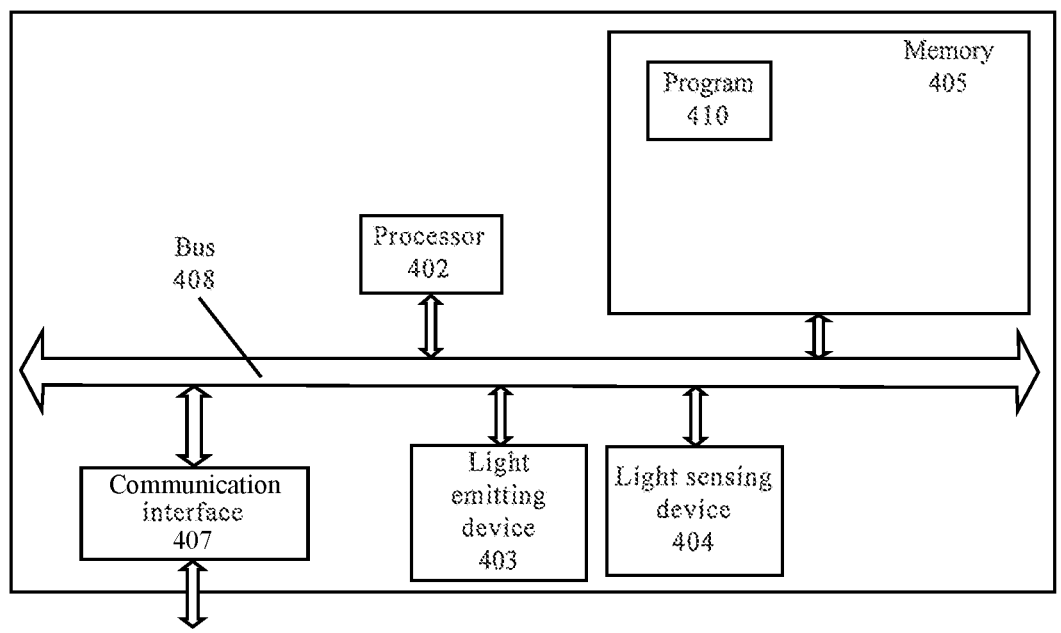
FIG. 4 is a schematic structural diagram of an optical substance detection device according to an embodiment of the present application.

FIG. 4 is a schematic structural diagram of an optical substance detection device according to an embodiment of the present application.

As illustrated in FIG. 4, the optical substance detection device may include: a processor 402, a light emitting device 403, a light sensing device 404, a memory 405, a communication interface 407, a communication bus 408 and a program 410.

The processor 402, the light emitting device 403, the light sensing device 404 and the memory 405 communicate with each other via the communication bus 408.

The communication interface 407 is configured to communicate with a network element such as a client, a server or the like.

The processor 402 is configured to execute the program 410, and may specifically perform steps in the embodiments of the method for controlling an optical substance detection device.

Specifically, the program 410 may include a program code, wherein the program code includes a computer-executable instruction.

The processor 402 may be a central processing unit (CPU) or an application specific integrated circuit (ASIC), or configured as one or more integrated circuits for implementing the embodiments of the present invention. The computing device includes one or more processors, which may be the same type of processors, for example, one or more CPUs, or may be different types of processors, for example, one or more CPUs and one or more ASICs.

The memory 405 is configured to store the program 410. The memory 405 may include a high-speed RAM memory, or may also include a non-volatile memory, for example, at least one magnetic disk memory.

The program 410 may be specifically configured to cause the processor 402 to perform the following operations:

when it is detected that the optical substance detection device is subjected to an impact, acquiring an impact force and an impact direction when the optical substance detection device is subjected to the impact; calculating a light sensing displacement deviation value according to a predetermined data model and in combination with the impact force and the impact direction; and performing light sensing correction according to the light sensing displacement deviation value.

It should be noted that the impact exerted to the optical substance detection device, and the impact force and impact direction when the optical substance detection device is subjected to the impact may be all detected by a sensor. In this case, the optical substance detection device further includes a sensor (not illustrated in the drawings). Upon acquiring data, the sensor sends the data to the processor to determine whether the optical substance detection device is subjected to the impact, and determine the impact force and impact direction when the optical substance detection device is subjected to the impact.

In an optional implementation, the program 410 may be specifically further configured to cause the processor 402 to perform the following operations:

controlling the optical substance detection device to continue operating normally when the light sensing displacement deviation value is less than a predetermined minimum value; sending calibration alarm information indicating that the optical substance detection device needs to be calibrated when the light sensing displacement deviation value is greater than or equal to a predetermined minimum value and is less than or equal to a predetermined maximum value; or controlling the optical substance detection device to stop operating and sending a repair alarm information indicating that the optical substance detection device needs to be repaired when the light sensing displacement deviation value is greater than a predetermined maximum value.

In an optional implementation, the program 410 may be specifically further configured to cause the processor 402 to perform the following operations:

judging whether the light sensing displacement deviation value is previously stored when the light sensing displacement deviation value is within a predetermined optical path correction range; and controlling the optical substance detection device to continue operating normally and storing the light sensing displacement deviation value if the light sensing displacement deviation value is not previously stored, and correcting a spectrum position of a returned light sensed by the light sensing device according to the light sensing displacement deviation value when the light sensing device senses the returned light.

In an optional implementation, the program 410 may be specifically further configured to cause the processor 402 to perform the following operations:

outputting calibration alarm information indicating that the optical substance detection device needs to be calibrated and controlling the optical substance detection device to stop operating if the light sensing displacement deviation value is previously stored; and clearing the stored light sensing displacement deviation value when it is detected that a light sensing optical path of the light sensing device is successfully calibrated.

In an optional implementation, the program 410 may be specifically further configured to cause the processor 402 to perform the following operations:

judging whether the light emitting device is in a state of outputting a detection light when it is detected that the optical substance detection device is in a drop-down state; and controlling the light emitting device to stop outputting the detection light if the light emitting device is in the state of outputting the detection light.

The algorithms and displays provided herein are not inherently related to any specific computer, virtual system or other device. Various general-purpose systems may also be used with the teachings herein. According to the above description, the structure required for constructing such systems is obvious. In addition, the present application is not directed to any specific programming language. It should be understood that the content of the present application described herein may be carried out utilizing various programming languages, and that the above description for a specific language is for the sake of disclosing preferred embodiments of the present application.

In the specification provided herein, a plenty of particular details are described. However, it may be understood that an embodiment of the present application may also be practiced without these particular details. In some embodiments, well known methods, structures and technologies are not illustrated in detail so as not to obscure the understanding of the specification.

Likewise, it shall be understood that, to streamline the present application and facilitate understanding of one or more of various aspects of the present application, in the above description of the exemplary embodiments of the present application, various features of the present application are sometimes incorporated in an individual embodiment, drawing or description thereof. However, the method according to the present application shall not be explained to embody the following intention: the present application for which protection is sought claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present application.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present application and different embodiments may be derived. For example, in the claims appended hereinafter, any one of the embodiments for which protection is sought may be practiced in any combination manner.

Embodiments of the individual components of the present application may be implemented in hardware, or in a software module running one or more processors, or in a combination thereof. It will be appreciated by those skilled in the art that, in practice, some or all of the functions of some or all of the components in the message prompting apparatus according to individual embodiments of the present application may be implemented using a microprocessor or a digital signal processor (DSP). The present application may also be implemented as an apparatus of a device program (e.g., a computer program and a computer program product) for performing a part or all of the method as described herein. Such a program implementing the present application may be stored on a computer-readable medium, or may be stored in the form of one or more signals. Such a signal may be obtained by downloading it from an Internet website, or provided on a carrier signal, or provided in any other form.

It should be noted that the above embodiments illustrate rather than limit the present application, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The word "a" or "an" used before an element does not exclude the presence of a plurality of such elements. The present application may be implemented by means of a hardware including several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A method for controlling an optical substance detection device, the optical substance detection device comprising a light sensing device, the method comprising:
   when it is detected that the optical substance detection device is subjected to an impact, acquiring an impact force and an impact direction when the optical substance detection device is subjected to the impact;
   calculating a light sensing displacement deviation value according to a data model and in combination with the impact force and the impact direction wherein the data model refers to a corresponding relationship between an impact force, and impact direction, and the light sensing displacement deviation value; and
   performing light sensing correction according to the light sensing displacement deviation value.

2. The method according to claim 1, wherein
   the performing light sensing correction comprises:
   controlling the optical substance detection device to continue operating normally when the light sensing displacement deviation value is less than a minimum value;
   sending calibration alarm information indicating that the optical substance detection device needs to be calibrated when the light sensing displacement deviation value is greater than or equal to a minimum value and is less than or equal to a maximum value; or
   controlling the optical substance detection device to stop operating and sending a repair alarm information indicating that the optical substance detection device needs to be repaired when the light sensing displacement deviation value is greater than a maximum value.

3. The method according to claim 1, wherein
   the performing light sensing correction comprises:
   judging whether the light sensing displacement deviation value is previously stored when the light sensing displacement deviation value is greater than or equal to a minimum value, and is less than or equal to a maximum value.

4. The method according to claim 3, wherein the performing light sensing correction further comprises:
   controlling the optical substance detection device to continue operating normally and storing the light sensing displacement deviation value if the light sensing displacement deviation value is not previously stored, and correcting a spectrum position of a returned light sensed by the light sensing device according to the light sensing displacement deviation value when the light sensing device senses the returned light.

5. The method according to claim 4, wherein the performing light sensing correction further comprises:
   outputting calibration alarm information indicating that the optical substance detection device needs to be calibrated and controlling the optical substance detection device to stop operating if the light sensing displacement deviation value is previously stored.

6. The method according to claim 5, wherein the performing light sensing correction further comprises:
   clearing the stored light sensing displacement deviation value when it is detected that a light sensing optical path of the light sensing device is successfully calibrated.

7. The method according to claim 1, wherein the optical substance detection device comprises a light emitting device; and
   the method further comprises:
   judging whether the light emitting device is in a state of outputting a detection light when it is detected that the optical substance detection device is in a dropping-down state; and
   controlling the light emitting device to stop outputting the detection light if the light emitting device is in the state of outputting the detection light.

8. An optical substance detection device, comprising: a light emitting device, a light sensing device, a processor, a memory, a communication interface and a communication bus; wherein the light emitting device, the light sensing device, the processor, the memory and the communication bus communicate with each other via the communication bus; and
   the memory is configured to store at least one executable instruction, wherein the executable instruction, when being executed, causes the processor to perform the steps of:
   when it is detected that the optical substance detection device is subjected to an impact, acquiring an impact force and an impact direction when the optical substance detection device is subjected to the impact;
   calculating a light sensing displacement deviation value according to a data model and in combination with the impact force and the impact direction wherein the data model refers to a corresponding relationship between an impact force and impact direction, and the light sensing displacement deviation value; and
   performing light sensing correction according to the light sensing displacement deviation value.

9. The optical substance detection device according to claim 8, wherein
   the performing light sensing correction comprises:
   controlling the optical substance detection device to continue operating normally when the light sensing displacement deviation value is less than a minimum value;
   sending calibration alarm information indicating that the optical substance detection device needs to be calibrated when the light sensing displacement deviation value is greater than or equal to a minimum value and is less than or equal to a maximum value; or
   controlling the optical substance detection device to stop operating and sending a repair alarm information indicating that the optical substance detection device needs to be repaired when the light sensing displacement deviation value is greater than a maximum value.

10. The optical substance detection device according to claim 8, wherein
    the performing light sensing correction comprises:
    judging whether the light sensing displacement deviation value is previously stored when the light sensing displacement deviation value is greater than or equal to a minimum value, and is less than or equal to a maximum value.

11. The optical substance detection device according to claim 10, wherein, wherein the performing light sensing correction further comprises:
controlling the optical substance detection device to continue operating normally and storing the light sensing displacement deviation value if the light sensing displacement deviation value is not previously stored, and correcting a spectrum position of a returned light sensed by the light sensing device according to the light sensing displacement deviation value when the light sensing device senses the returned light.

12. The optical substance detection device according to claim 11, wherein, wherein the performing light sensing correction further comprises:
outputting calibration alarm information indicating that the optical substance detection device needs to be calibrated and controlling the optical substance detection device to stop operating if the light sensing displacement deviation value is previously stored.

13. The optical substance detection device according to claim 12, wherein, wherein the performing light sensing correction further comprises:
clearing the stored light sensing displacement deviation value when it is detected that a light sensing optical path of the light sensing device is successfully calibrated.

14. The optical substance detection device according to claim 8, wherein the executable instruction, when being executed, further causes the processor to perform the steps of:
judging whether the light emitting device is in a state of outputting a detection light when it is detected that the optical substance detection device is in a dropping-down state; and
controlling the light emitting device to stop outputting the detection light if the light emitting device is in the state of outputting the detection light.

15. A non-transitory computer-readable storage medium, the storage medium storing at least one executable instruction; wherein the executable instruction, when being executed, causes a processor to perform the steps of:
when it is detected that the optical substance detection device is subjected to an impact, acquiring an impact force and an impact direction when the optical substance detection device is subjected to the impact;
calculating a light sensing displacement deviation value according to a data model and in combination with the impact force and the impact direction wherein the data model refers to a corresponding relationship between an impact force and impact direction, and the light sensing displacement deviation value; and
performing light sensing correction according to the light sensing displacement deviation value.

16. The non-transitory computer-readable storage medium according to claim 15, wherein
the performing light sensing correction comprises:
controlling the optical substance detection device to continue operating normally when the light sensing displacement deviation value is less than a minimum value;
sending calibration alarm information indicating that the optical substance detection device needs to be calibrated when the light sensing displacement deviation value is greater than or equal to a minimum value and is less than or equal to a maximum value; or
controlling the optical substance detection device to stop operating and sending a repair alarm information indicating that the optical substance detection device needs to be repaired when the light sensing displacement deviation value is greater than a maximum value.

17. The non-transitory computer-readable storage medium according to claim 15, wherein
the performing light sensing correction comprises:
judging whether the light sensing displacement deviation value is previously stored when the light sensing displacement deviation value is greater than or equal to a minimum value, and is less than or equal to a maximum value.

18. The non-transitory computer-readable storage medium according to claim 17, the performing light sensing correction further comprises:
controlling the optical substance detection device to continue operating normally and storing the light sensing displacement deviation value if the light sensing displacement deviation value is not previously stored, and correcting a spectrum position of a returned light sensed by the light sensing device according to the light sensing displacement deviation value when the light sensing device senses the returned light.

19. The non-transitory computer-readable storage medium according to claim 18, the performing light sensing correction further comprises:
outputting calibration alarm information indicating that the optical substance detection device needs to be calibrated and controlling the optical substance detection device to stop operating if the light sensing displacement deviation value is previously stored; and
clearing the stored light sensing displacement deviation value when it is detected that a light sensing optical path of the light sensing device is successfully calibrated.

20. The non-transitory computer-readable storage medium according to claim 15, wherein the executable instruction, when being executed, causes the processor to perform the steps of:
judging whether the light emitting device is in a state of outputting a detection light when it is detected that the optical substance detection device is in a dropping-down state; and
controlling the light emitting device to stop outputting the detection light if the light emitting device is in the state of outputting the detection light.

* * * * *